United States Patent [19]

Burnham et al.

[11] Patent Number: 4,884,828

[45] Date of Patent: Dec. 5, 1989

[54] SECURITY DOCUMENTS

[75] Inventors: Audrey R. Burnham; Christopher J. Ewards; Roger E. Munn, all of Oxfordshire, England

[73] Assignee: CMB Packaging (UK) Limited, Reading, England

[21] Appl. No.: 152,271

[22] Filed: Feb. 4, 1988

[30] Foreign Application Priority Data

Feb. 18, 1987 [GB] United Kingdom ................. 8703689

[51] Int. Cl.[4] ...................... B42D 15/00; B42D 15/02; G02B 3/18; G01B 11/14

[52] U.S. Cl. ........................................ 283/89; 283/92; 350/162.2; 356/374

[58] Field of Search ........................ 283/72, 86, 87, 88, 283/89, 90, 91, 92, 93, 94, 95; 356/109, 374; 340/146; 354/103; 235/61.7; 350/3.6, 162.2, 162.17

[56] References Cited

U.S. PATENT DOCUMENTS

| | | | |
|---|---|---|---|
| 2,065,605 | 12/1936 | Moore | 283/93 |
| 3,585,286 | 6/1971 | Macovski | 350/162.2 |
| 3,886,083 | 8/1974 | Laxer | 283/92 |
| 4,066,280 | 1/1978 | La Capria | 283/92 |
| 4,168,088 | 9/1979 | Somlyody | 283/93 |
| 4,442,170 | 4/1984 | Kaule et al. | 283/89 |
| 4,525,858 | 6/1985 | Cline et al. | 356/374 |
| 4,582,346 | 4/1986 | Caprio et al. | 283/93 |
| 4,588,212 | 5/1986 | Castagnoli | 283/72 |
| 4,627,642 | 12/1986 | Peronneau et al. | 350/162.2 |
| 4,661,983 | 4/1987 | Knop | 350/162.2 |

FOREIGN PATENT DOCUMENTS

| | | |
|---|---|---|
| 0046327 | 8/1981 | European Pat. Off. . |
| 202702 | 5/1922 | United Kingdom . |
| 243789 | 9/1924 | United Kingdom . |
| 1138011 | 7/1965 | United Kingdom . |
| 2082119 | 4/1981 | United Kingdom . |

*Primary Examiner*—Frank T. Yost
*Assistant Examiner*—Paul M. Heyrana, Sr.
*Attorney, Agent, or Firm*—Diller, Ramik & Wight

[57] ABSTRACT

A security document has security printing formed as a moire pattern of two superimposed sets of generally parallel lines. In each line set the line spacing varies progressively along the length of the lines so that each line set has one or more areas in which the line frequency is low and individual lines can be seen with the naked eye, and one or more further areas of high line frequency in which individual lines can only be readily distinguished by using magnification. Futhermore, the thickness of each line varies progressively between relatively large and relatively small values corresponding respectively to the areas of low and high line frequency, the ration of line spacing to line thickness being approximately constant so that the color or tonal density of the security printing is approximately uniform. For additional security the individual line sets are printed in inks of which the colors can be differentiated by the naked eye but not by a reproducing machine used for counterfeiting. One or both of the line sets may additionally or alternatively be printed in an ink having an anti-fraud characteristic such, for example, as waterfugitivity, solvent-sensitivity or UV fluroescence.

21 Claims, 1 Drawing Sheet

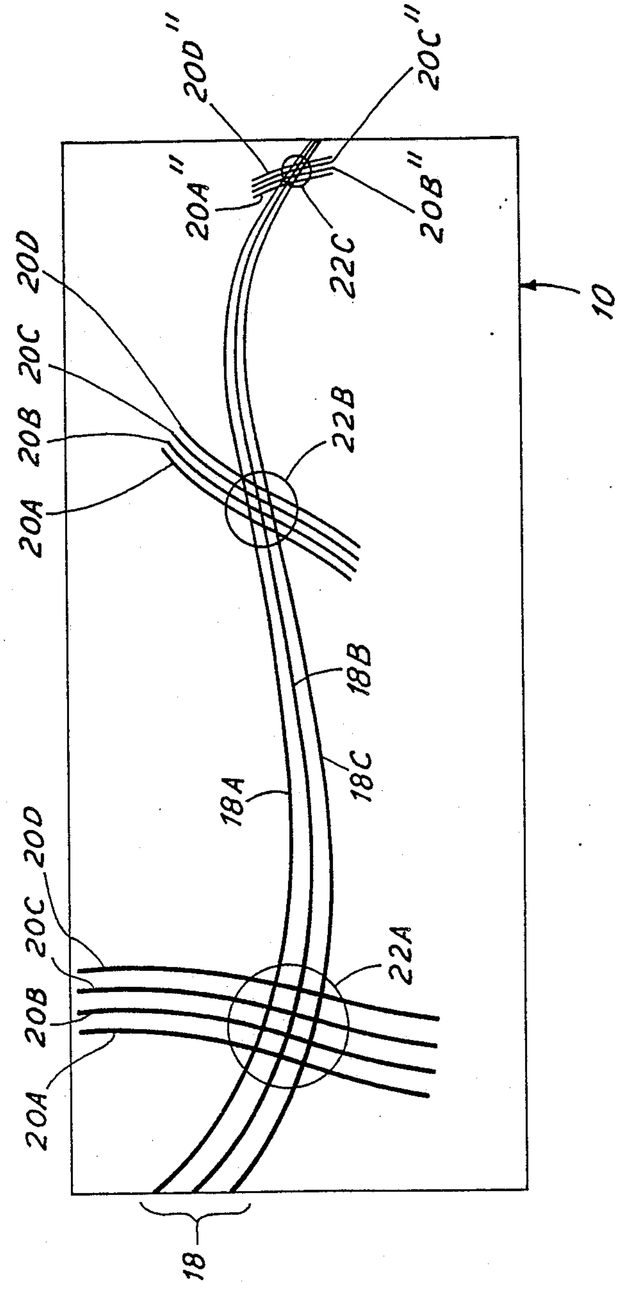
20D''
20C''
20A''
20B''
22C
10
20D
20C
20B
20A
22B
18B
18C
18A
20D
20C
20B
20A
22A
18

SECURITY DOCUMENTS

BACKGROUND TO THE INVENTION

This invention relates to security documents, that is to say, documents such as cheques, bank notes, bankers drafts, etc. which have anti-counterfeiting features provided by security printing.

For security documents it is well known to use moire patterns which are interference fringes arising from two sets-of generally parallel lines, the line sets being superimposed upon one another with their lines intersecting and mutually inclined at a small angle.

Such moire patterns have hitherto provided a satisfactory degree of security against counterfeiting, but developments in the technical apparatus available to the counterfeiter (for example, color photocopiers) have rendered them increasingly less secure. The present invention therefore seeks to improve the security provided by moire patterns, and accordingly provides, according to the first aspect, a security document, which is printed with a moire pattern formed of first and second sets of intersecting lines arranged to form one or more moire effect interference fringes, wherein the lines of at least one of the line sets vary progressively in thickness along their length.

For additional security one or both of the sets of lines may be printed in inks having anti-fraud characteristics. The anti-fraud characteristics (where provided) of the two inks may differ, or they may be the same; for example, one set of lines may be printed in a solvent-sensitive ink and the other in a water-fugitive ink. As another possibility, one or both sets of lines may be printed in an ink so as to be visually distinguishable only under special lighting for example, under ultra-violet (UV) light.

SUMMARY

According to a preferred feature of the invention, in at least one, and preferably both, of the sets of lines of the moire pattern the line frequency of the line set, that is to say, its number of lines per unit of transverse distance, is varied to provide an area or areas of the document in which the lines of the set have a relatively high line frequency and so are closely packed and difficult or impossible to distinguish with the naked eye, and a further area or further areas in which the lines have a relatively low line frequency and so are sufficiently spaced to be individually seen; preferably with such an arrangement the thickness of each line of the said line set is varied generally in accordance with the line frequency, the line thickness being relatively large in the said area or areas of low line frequency and being relatively small in the said area or areas of high line frequency. It is preferred that in each line set the ratio of line thickness to line frequency should be approximately constant so as to create a substantially uniform color or tone density over the area of the moire pattern; moreover, the line thicknesses and the spacing of the two line sets may advantageously be generally in spatial correspondence so that the said area or areas of high or low line frequency of the two sets are coincident.

In accordance with the invention from a second aspect there is provided a security document which is printed with a moire pattern formed of first and second sets of intersecting lines arranged to form one or more moire effect interference fringes, wherein the line sets are printed in respective colors which can be differentiated visually but which are difficult or impossible to differentiate by machine for reproduction in a counterfeiting operation.

Applicants believe that a combination of the two aspects of the invention which are defined above can be particularly advantageous, and in accordance with a third aspect of the invention there is accordingly provided a security document, which is printed with a moire pattern formed of first and second sets of intersecting lines arranged to form one or more moire effect interference fringes, wherein the line sets are printed in respective colors which can be differentiated visually but which are difficult or impossible to differentiate by machine for reproduction in a counterfeiting operation, in each line set the line frequency being varied to provide the line set with an area or areas in which the lines have a relatively high line frequency and so are closely packed and difficult or impossible to distinguish with the naked eye, and a further area or areas in which the lines have a relatively low line frequency and so are sufficiently spaced to be individually seen, each line having a thickness which varies generally in accordance with the line frequency so that in a said area or said areas of low line frequency the line thickness is relatively large and in a said area or said areas of high line frequency the line thickness is relatively small.

BRIEF DESCRIPTION OF THE DRAWINGS

The accompanying diagrammatic drawing which shows an area of security printing having a moire pattern in accordance with the invention. For illustration purposes the security printing is shown enlarged by a factor of approximately two.

DESCRIPTION OF THE PREFERRED EMBODIMENTS

Referring now to the drawing, there is shown an area 10 of security printing which is to be understood as being formed on a security document such as a cheque. For the purposes of illustration the area is shown as being rectangular, but it may of course be of any desired shape and it may cover all or only part of the security document; moreover, it may itself be part of a larger area of security printing.

Over the area 10 the security printing has a moire pattern formed by two line sets or grids 18, 20 which are superimposed on one another. Each line set is formed of a plurality of generally parallel but irregularly curved, fine lines which are printed by conventional methods on the substrate of the security document (which is typically of paper).

For the purposes of illustration the drawing shows three typical and mutually adjacent lines of the first line set 18, as they appear within the area 10. The lines are identified by the reference numbers 18A, 18B and 18C respectively, with the line 18B intermediate the other two lines. Also shown are portions of some of the lines of the second line set 20 in the locality of the lines 18A, 18B and 18C, and it will be understood that because of curvature and relative positions the lines of the two line sets will make small and varied angles at the intersections between them over the area of the security printing; in known manner the lines of the two sets therefore interfere with one another to form moire effect interference fringes.

In the drawing three groups of portions of the lines of the line set 20 are shown; a first group has its four lines referenced 20A, 20B, 20C and 20D, a second has its four lines referenced 20A', 20B', 20C', and 20D', and the third has its four lines referenced 20A", 20B", 20C" and 20D". Depending on the configuration of the line set 20, these line portions may form parts of the same lines, or they may be separate from one another.

From the representation of the line set 18 provided by the lines 18A, 18B and 18C it will be understood that in each line set 18, 20 the spacing between adjacent lines varies progressively along the line length; thus the lines 18A, 18B and 18C of the line set 18 are seen to have a relatively wide spacing at the left hand end of the area 10, and a relatively small spacing at its right hand end.

The line frequency of each line set 18, 20, that is to say, its number of lines per unit of transverse distance on the security printing, therefore varies progressively over the area of the security printing between relatively high and relatively low values, these values corresponding respectively to the lowest and highest values of the line spacing of that line set. In the drawing the three areas shown for the intersection of the lines of the line set 20 with the lines 18A, 18B and 18C are ringed and denoted by the reference numerals 22A, 22B and 22C in ascending order of line frequency of the line set 18.

The relatively high value of line spacing of each line set 18, 20 is selected to give one or more areas of the security printing in which the lines of the set are sufficiently spaced to be individually seen by the naked eye, whereas the relatively low value of the line spacing is selected to give one or more areas in which the lines are closely packed and difficult or impossible to distinguish with the naked eye. Because of the progressive variation of the line spacing along the length of each line, the line frequency of the respective line set therefore changes progressively between these two extremes. It is therefore to be understood that at the left hand end of the lines 18A, 18B and 18C, for example within the ringed area 22A, the lines of the line set 18 are easily visible by, and distinguishable with, the naked eye; at the right hand end however, for example within the ringed area 22C, the lines of the line set 18 are closely spaced and cannot easily be visually distinguished except with magnification.

The line set 20 similarly has areas of high and low line frequency, and in the security printing 10 these are made to coincide with the areas of high and low line frequency respectively of the line set 18. Thus the ringed areas *22a*, *22b* and *22c* respectively denote areas of low, medium and high line frequency of both of the line sets 18, 20.

In addition to the line frequency variations described above, each line set 18, 20 is also subject to thickness variations of its individual lines. As will be evident from the lines 18A, 18B and 18C, in each line set the line thickness varies progressively, generally in accordance with the line spacing; thus, the maximum line thickness corresponds to the maximum line spacing (and the minimum line frequency), and the minimum line thickness corresponds to the minimum line spacing. Furthermore, the thickness variation of each line is such that the ratio of the line thickness to the line spacing is maintained substantially constant. The line thickness variation thus provides additional anti-counterfeiting security in its own right, whilst accentuating the visibility of the lines in the areas of low line density and providing good line definition in the areas of high line density; furthermore the variation of the line thickness, which is generally in inverse relation to the line frequency, gives the area 10 of security printing a uniformly dense color or tonal appearance.

Typical values of line frequency and line thickness are, respectively, 4 lines $mm^{-1}$ and 0.075 mm in the areas of high line frequency, and 0.5 lines $mm^{-1}$ and 0.5 mm in the areas of low line frequency.

A further anti-counterfeiting feature of the security printing 10, which is not apparent from the drawing, is the printing of the two line sets 18, 20 in respective inks the spectral characteristics of which are such that they can be differentiated visually but are difficult or impossible to differentiate by machine for reproduction in a counterfeiting operation; in particular, the inks are not reproduced authentically using color copying machines. The table below defines two pairs of such inks which Applicants have found to be effective. The inks are defined in accordance with the CIELAB (1976) color space.

Measurement conditions related to sphere geometry and included the specular but excluded the UV components. Colormetric data was specified for the 10° standard observer and a D65 light source.

| | | L | C | H |
|---|---|---|---|---|
| PAIR 1 | Ink (a) | 82.13 | 18.56 | 336.91 |
| | Ink (b) | 78.72 | 17.12 | 326.78 |
| PAIR 2 | Ink (a) | 84.80 | 12.57 | 179.37 |
| | Ink (b) | 80.92 | 13.16 | 205.53 |

As a further security measure one or both of the inks used for printing the line sets 18, 20 may have an anti-fraud characteristic such, for example, as solvent-sensitivity or water-fugitivity. The same characteristic may be used for the two inks, or differing characteristics may be used. Amongst the possible combinations are:

(1) Both inks water-fugitive.
(2) Both inks solvent-sensitive.
(3) One ink water-fugitive, the other ink solvent-sensitive.
(4) One or both inks UV-fluorescent, but invisible in daylight or normal artificial light.

Although preferred, it is not essential to the invention that the various anti-counterfeiting features which are incorporated in the described embodiment should be used in combination. Within the scope of the invention, therefore, are security documents printed with a moire pattern of which the thickness and spacing of its line are conventional, but of which the two inks used for printing the two line sets have spectral characteristics satisfying the criteria given above for the inks of the line sets 18, 20. Likewise, the invention includes moire patterns having their line sets printed in conventional inks but using a progressively varying line thickness spacing.

Furthermore, although it is preferred that line thickness variation (where provided) should be accompanied by corresponding line spacing variation as described, this is not essential. Conversely, line spacing variation may be used alone, that is to say, not in combination with line thickness variation.

Although in the described embodiment the lines of the two line sets 18, 20 are represented as being continuous and subject only to relatively large scale variation, within the scope of the invention are moire patterns having lines which are discontinued and/or are subject to small-scale variation in addition to any large scale variations. Thus, the lines may be formed of alphanumeric characters forming, for example, the name of a clearing bank; the characters may be separate or conjoined.

Whilst it has been described above in relation to pairs of line sets which are superimposed so as to form interference fringes by the moire effect, the invention may extend to line sets which are used singly in their own right and in which the line thickness and/or the line spacing are progressively varied.

We claim:

1. A security document comprising a carrier which is printed with a plurality of line sets, each line set comprising a plurality of generally parallel lines, the thickness of each line of at least one line set varies progressively along its entire length, the line frequency of said at least one line set is varied to provide said at least one line set with a first area in which the lines of said at least one line set have a relatively high line frequency and are closely packed and difficult or impossible to distinguish with the naked eye, and a second area in which the lines of said at lest one line set have a relatively low line frequency and are sufficiently spaced to be individually seen.

2. A security document according to claim 1 wherein said at least one line set is printed in an ink having an anti-fraud characteristic.

3. A security document according to claim 1 wherein said at least one line set is printed in a water-fugitive ink.

4. A security document according to claim 1 wherein said at least one line set is printed in a solvent-sensitive ink.

5. A security document according to claim 1 wherein said at least one line set is printed in an ink which is fluorescent to ultra-violet light but which is invisible in daylight or normal artificial light.

6. A security document according to claim 1 including another set of generally parallel lines of which the thickness varies progressively along their entire length, one of said at least one and another line sets is printed in a water-fugitive ink, and the other of said at least one and another line sets is printed in a solvent-sensitive ink.

7. A security document according to claim 1, wherein the thickness of each line of said at least one line set is varied generally in accordance with the line frequency, the line thickness being relatively large in said second area of low line frequency and being relatively small in said first area of high line frequency.

8. The security document as defined in claim 1 wherein said first and second areas are created by a second line set and a third line set of said plurality of line sets each intersecting said at least one line set.

9. The security document as defined in claim 8 wherein the line thickness of the lines of said at least one line set is relatively smaller in said first area than in said second area.

10. The security document as defined in claim 9 wherein the thickness of the lines of said at least one line set reduces in a direction from said second area toward said first area.

11. The security document as defined in claim 8 wherein the thickness of the lines of said at least one line set reduces in a direction from said second area toward said first area.

12. The security document as defined in claim 1 wherein the line thickness of the lines of said at least one line set is relatively smaller in said first area than in said second area.

13. The security document as defined in claim 12 wherein the thickness of the lines of said at least one line set reduces in a direction from said second area toward said first area.

14. The security document as defined in claim 13 wherein the line thickness of the lines of said at least one line set is relatively smaller in said first area than in said second area.

15. The security document as defined in claim 1 wherein the thickness of the lines of said at least one line set reduces in a direction from said second area toward said first area.

16. A security document comprising a carrier which is printed with a moire pattern formed of first and second sets of intersecting lines arranged with the spacing of the lines of the line sets and the orientation of the line sets relative to one another, at least on a part of the carrier, being so as to form at least one moire effect interference fringe, and the lines of at least one of the line sets vary progressively in thickness along their length.

17. A security document according to claim 16, wherein the lines of both of the first and second line sets vary progressively in thickness along their lengths.

18. A security document comprising a carrier which is printed with a moire pattern formed of first and second sets of intersecting lines arranged to form at least one moire effect interference fringe, said line sets are printed in respective colors which can be differentiated visually but which are difficult or impossible to differentiate by machine for reproduction in a counterfeiting operation, in each line set the line frequency being varied to provide the line set with at least one area in which the lines have a relatively high line frequency and are closely packed and difficult or impossible to distinguish with the naked eye, and a further area in which the line have a relatively low line frequency and are sufficiently spaced to be individually seen, and each line having thickness which varies generally in accordance with the line frequency so that in said area of low line frequency the line thickness is relatively large and in a said area of high line frequency the line thickness is relatively small.

19. A security document comprising a carrier which is printed with a moire pattern formed of first and second sets of intersecting lines arranged with the spacing of the lines of the line sets and the orientation of the line sets relative to one another, at least on a part of the carrier, being so as to form at least one moire effect interference fringe, and the line sets are printed in respective colors which can be differentiated visually but which are difficult or impossible to differentiate by machine for reproduction in a counterfeiting operation.

20. A security document comprising a carrier which is printed with a moire pattern formed of first and second sets of intersecting lines arranged with the spacing of the lines of the line sets and the orientation of the line sets relative to one another, at least on a part of the carrier, being so as to form at least one moire interference fringe, and the spacing of the lines of at least one of the first and second line sets varies progressively along the length of the lines.

21. A security document comprising a carrier which is printed with a moire pattern formed of first and second sets of intersecting lines arranged with the spacing of the lines of the line sets and the orientation of the line sets relative to one another, at least on a part of the carrier, being so as to form at least one moire effect interference fringe, wherein the line frequency of each line set is varied to provide the line set with at least one area in which the lines of the line set have a relatively high line frequency and are closely packed and difficult or impossible to distinguish with the naked eye, and a further area in which the lines of the line set have a relatively low line frequency and are sufficiently spaced to be individually seen the thickness of each line being varied progressively along its length generally in accordance with the line frequency and being relatively large in said area of low line frequency and being relatively small in said area of high line frequency, and said areas of high and low frequency being generally in correspondence as between the line sets.

* * * * *